(12) United States Patent
Gutmark et al.

(10) Patent No.: US 6,460,341 B1
(45) Date of Patent: *Oct. 8, 2002

(54) METHOD FOR MINIMIZING THERMOACOUSTIC OSCILLATIONS IN GAS TURBINE COMBUSTION CHAMBERS

(75) Inventors: Ephraim Gutmark, Baton Rouge, LA (US); Christian Oliver Paschereit, Baden (CH); Wolfgang Weisenstein, Remetschwiel (CH)

(73) Assignee: Alstom, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/382,627

(22) Filed: Aug. 25, 1999

(30) Foreign Application Priority Data

Sep. 16, 1998 (EP) .............................. 98810923

(51) Int. Cl.$^7$ ............................... F02C 7/24
(52) U.S. Cl. ........................ 60/772; 60/775; 60/39.55; 60/725
(58) Field of Search ................... 60/772, 775, 34.5, 60/725, 740

(56) References Cited

U.S. PATENT DOCUMENTS

| | | | | |
|---|---|---|---|---|
| 2,927,423 A | * | 3/1960 | Wisniowski | 60/35.6 |
| 3,748,852 A | * | 7/1973 | Cole | 60/39.65 |
| 4,557,106 A | * | 12/1985 | Ffowcs | 431/1 |
| 4,697,413 A | * | 10/1987 | Pohl | 48/197 R |
| 5,295,351 A | * | 3/1994 | Rathbone | 266/155 |
| 5,428,951 A | * | 7/1995 | Wilson et al. | 60/39.06 |
| 5,540,045 A | * | 7/1996 | Corbett et al. | 60/39.3 |
| 5,715,671 A | * | 2/1998 | Griffiths | 60/39.02 |

FOREIGN PATENT DOCUMENTS

DE  4339094 A1  5/1995

* cited by examiner

Primary Examiner—Ehud Gartenberg
(74) Attorney, Agent, or Firm—Burns, Doane, Swecker & Mathis, L.L.P.

(57) ABSTRACT

In a method for minimizing thermoacoustic oscillations in gas turbine combustion chambers, an inert gas ($N_2$, $CO_2$, $H_2O$) is additionally mixed with the stream of fuel.

7 Claims, 1 Drawing Sheet

Combustion instabilities suppressed by injection of $N_2$ into the gaseous fuel line. Test results obtained with an ABB EV burner at $\lambda = 2$.

Combustion instabilities suppressed by injection of $N_2$ into the gaseous fuel line. Test results obtained with an ABB EV burner at $\lambda = 2$.

METHOD FOR MINIMIZING THERMOACOUSTIC OSCILLATIONS IN GAS TURBINE COMBUSTION CHAMBERS

The invention relates to a method for minimizing thermoacoustic oscillations in gas turbine combustion chambers.

BACKGROUND OF THE INVENTION is known that undesirable thermoacoustic oscillations often occur in combustion chambers of gas turbines. The term "thermoacoustic oscillations" denotes thermal and acoustic disturbances which build up in opposition to one another. In this case, high oscillation amplitudes may occur, which may lead to undesirable effects, such as, for example, to a high mechanical load on the combustion chamber and increased $NO_x$ emissions due to inhomogeneous combustion, and even to the flame being extinguished. This applies, in particular, to combustion systems which have only little acoustic damping.

In conventional combustion chambers, the cooling air flowing into the combustion chamber has an important function, since the cooling air film on the combustion chamber wall has a sound insulating effect and therefore contributes to reducing thermoacoustic oscillations. In order to achieve low $NO_x$ emissions, in modern gas turbines an increasing proportion of the air is conducted through the burners themselves, that is to say the cooling air stream is reduced. Since there is consequently less sound insulation, therefore, the initially mentioned problems associated with the undesirable oscillations arise to an increased extent in such modern combustion chambers.

One possibility for sound insulation is for Helmholtz dampers to be coupled in the combustion chamber hood or in the region of the cooling air supply. If conditions of space are restricted, however, this being typical of modern combustion chambers of compact design, accommodating such dampers may present difficulties. This method therefore entails a high outlay in terms of construction.

In addition, it is known that the fluidic stability of a gas turbine burner is of critical importance for the occurrence of thermoacoustic oscillations. The fluidic instability waves occurring in the burner lead to the formation of vortices. These vortices, also designated as coherent structures, play an important part in mixing processes between air and fuel. The dynamics of the coherent structures influence, combustion and the associated release of heat. These vortices may therefore lead to a periodic release of the heat of the burner flame and therefore to pressure fluctuations. Particularly when there is no homogeneous intermixing of fuel and air over the entire surface of the burner, the occurrence of coherent vortex structures has a pronounced effect on the formation of thermoacoustic instabilities.

A further possibility for reducing the tendency of a burner to oscillate is therefore to prevent or at least reduce the vortex formation described above. This leads to an improvement in the intermixing of fuel and air and to a reduction in the tendency of the burner to oscillate. In this respect, the type of fuel injection exerts a decisive influence on the mixture quality and therefore on the position and shape of the flame which is established.

SUMMARY OF THE INVENTION

Accordingly, one object of the invention is to provide a novel method for minimizing the pressure amplitude of thermoacoustic oscillations in gas turbine combustion chambers. This object is achieved, according to the invention, by means of the method for minimizing the pressure amplitude of thermoacoustic oscillations in a gas turbine according to the invention.

According to the invention, an additional inert gas is mixed in with the fuel stream of the gas turbine burner. The fuel/air pulse ratio is thereby increased, thus leading to a reduction in the formation of coherent structures and to improved intermixing of the fuel/air mixture. In the method according to the invention, therefore, a reduction in the thermoacoustic oscillations can be achieved by varying the quantity of mixed-in inert gas at the gas turbine.

The decrease in pulsations, along with a controlled addition of inert gas, reduces the emission of $NO_x$. The decrease in the emission of $NO_x$ is, in this case, proportional to the decrease in the pressure oscillation amplitudes.

Within the scope of the present invention, the term "inert gas" is used with regard to the combustion operation taking place in the burner. This means that the inert gas additionally mixed in does not participate in the chemical reactions which take place during the combustion of the fuel. Gases which satisfy the abovementioned preconditions are, for example, nitrogen, carbon dioxide or steam. These gases or else to the present invention. In addition, however, other gases which do not react under the conditions described may also be used. The rare gases He, Ne, Ar, Kr and Xe may be mentioned as examples.

It is pointed out, in this connection, that the additional injection of an inert gas does not change the $\lambda$-number. The $\lambda$-number is generally used for describing the air/fuel ratio in combustion operations. The $\lambda$-value is a measure of the ratio of the air quantity introduced into the combustion space to the air quantity required theoretically for complete combustion. Gas turbine burners of the type used in the present invention are operated, as a rule, in a range of $1.8 \leq \lambda \leq 2.2$. By mixing an inert gas in with the fuel stream according to the invention, therefore, the $\lambda$-number is not changed, since the inert gas additionally present does not participate in the combustion operation.

The method according to the invention is not restricted only to double-cone burners, but may also be applied to other burners (AEV, premixing burners, diffusion burners).

The method according to the invention may also be employed as a remedy for combustion-driven oscillations due to soft fuel systems. As a result of the additional injection of inert gas, the pressure loss via fuel injection increases. Pressure fluctuations in the fuel system are thereby prevented.

The quantity of inert gas to be injected can be reduced effectively if modulated injection is selected instead of continuous injection. By modulated injection is meant, according to the invention, any injection of inert gas which varies in time. Modulation may take place, according to the invention, at any desired frequency. Preferably, injection is carried out at a frequency of between 0.3 Hz and 5 kHz, the range of 5 Hz to 150 Hz being particularly preferred.

At the same time, within the scope of the present invention, the quantity of inert gas injected per unit time may be varied in any desired way. Preferably, the gas is injected in the form of a pulse of limited time, and subsequently no gas is added for a specific time. If the period of time of gas injection is designated by $t_{addition}$ and the period of time without gas injection by $t_0$, the duration of the modulation of gas injection is obtained as $\tau = t_{addition} + t_0$ and the frequency as $\nu = 1/\tau = 1/(t_{addition} + t_0)$ Within the scope of the present invention, the ratio of $t_{addition}$ to $\tau$ is expressed as a percentage by means of the term "duty cycle". In the case of a duty cycle of 50%, therefore, the period of time of additional gas injection is equal to the period of time in which no additional gas is injected. The addition of a constant quantity of gas corresponds to a duty cycle of 100%.

The injection of additional inert gas into the premix gas ducts of the burner is carried out, according to the invention, with a duty cycle lower than 100%. The range of 1%≦duty cycle≦50% is preferred.

BRIEF DESCRIPTION OF THE DRAWINGS

A more complete appreciation of the invention and many of the attendant advantages thereof will be readily, obtained as the same becomes better understood by reference to the following detailed description when considered in connection with the accompanying drawings, wherein.

DETAILED OF THE INVENTION

Figure 1:
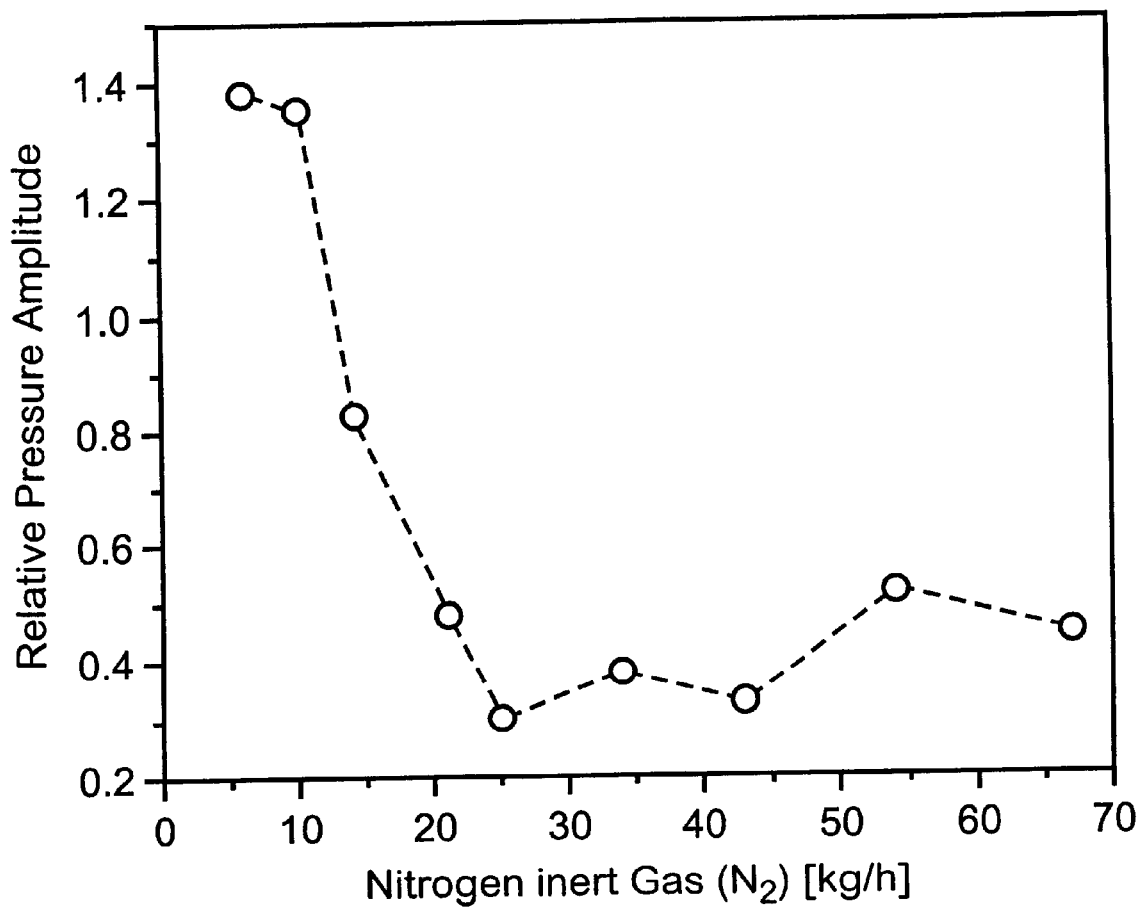
FIG. 1 shows a plot of the relative pressure amplitude against the mass flow of nitrogen (inert gas) which is admixed in a constant quantity with the fuel stream.

The relative pressure amplitude has been plotted in FIG. 1 against the mass flow of inert gas (nitrogen) injected additionally into the fuel stream. The tests were conducted on an ABB EV burner with a power of approximately 450 kW and λ=2. It can be seen clearly that the pressure amplitude of the thermoacoustic oscillations is greatly reduced when an additional constant quantity of inert gas of more than 10 kg/h is injected.

Investigations with a different burner power and a variation of λ of between 1.8 and 2.2 led to similar results. In the case of modulated injection of the inert gas, a similar reduction in the pressure amplitude was likewise obtained, but a smaller overall quantity of nitrogen was added.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method for minimizing the pressure amplitude of thermoacoustic oscillations in a gas turbine, the gas turbine having a gaseous fuel stream passing through premix gas ducts upstream of a combustion chamber, the method comprising the steps of:

injecting the gaseous fuel stream at a total mass flow rate from the premix gas ducts directly into the combustion chamber; and additionally adding an inert gas into the gaseous fuel stream passing through the premix gas ducts to increase the total mass flow rate and thereby suppress any fluctuations in the total mass flow rate potentially caused by downstream pressure fluctuation; and further comprising the step of modulating the injection of the inert gas.

2. The method as claimed in claim 1, further comprising the step of: selecting the inert gas from the group consisting of $N_2$, $CO_2$ and $H_2O$, and mixtures of these gases.

3. The method as claimed in claim 1 wherein a complete modulation period comprises the injection of the inert gas in the form of a pulse of limited time and of the subsequent absence of the inert gas addition.

4. The method as claimed in claim 1, further comprising the step of modulating said injection of said inert gas at a frequency between 0.3 Hz and 5 KHz.

5. The method as claimed in claim 4, further comprising the step of modulating said injection of said inert gas at a frequency between 5 Hz and 150 Hz.

6. The method as claimed in claimed 1, further comprising the step of:

modulating the injection of the inert gas at a duty cycle lower than 100%.

7. The method as claimed in claim 6, further comprising the step of:

satisfying the condition 1%≦duty cycle ≦50%.

* * * * *